(12) United States Patent
Tseng et al.

(10) Patent No.: US 11,716,152 B2
(45) Date of Patent: Aug. 1, 2023

(54) TRANSCEIVER AND TRANSCEIVER CALIBRATION METHOD

(71) Applicant: REALTEK SEMICONDUCTOR CORPORATION, Hsinchu (TW)

(72) Inventors: Bishen Tseng, Hsinchu (TW); Meng Che Li, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/728,841

(22) Filed: Apr. 25, 2022

(65) Prior Publication Data
US 2023/0057043 A1    Feb. 23, 2023

(30) Foreign Application Priority Data

Aug. 18, 2021  (TW) ................. 110130524

(51) Int. Cl.
*H04B 17/00*     (2015.01)
*H04B 17/21*     (2015.01)
*H04B 17/11*     (2015.01)

(52) U.S. Cl.
CPC ......... *H04B 17/0085* (2013.01); *H04B 17/11* (2015.01); *H04B 17/21* (2015.01)

(58) Field of Classification Search
CPC ..... H04B 17/0085; H04B 17/11; H04B 17/21
See application file for complete search history.

(56) References Cited

U.S. PATENT DOCUMENTS

| | | | | |
|---|---|---|---|---|
| 5,293,406 A | * | 3/1994 | Suzuki | H04L 27/364 332/107 |
| 10,498,466 B1 | * | 12/2019 | Chang | H04B 17/101 |
| 11,057,123 B1 | * | 7/2021 | Chang | H04B 1/38 |
| 2003/0206603 A1 | * | 11/2003 | Husted | H04L 27/3863 375/324 |
| 2005/0111575 A1 | * | 5/2005 | Taler | H03F 1/3276 375/297 |
| 2007/0047634 A1 | * | 3/2007 | Kang | H04B 17/101 375/281 |
| 2012/0170622 A1 | * | 7/2012 | Ly-Gagnon | H04L 27/3854 375/219 |
| 2014/0192922 A1 | * | 7/2014 | Wyville | H04B 1/0475 375/295 |
| 2014/0341263 A1 | * | 11/2014 | Wu | H04B 17/21 375/224 |
| 2016/0329631 A1 | * | 11/2016 | Rheinfelder | H01Q 21/0025 |
| 2022/0200654 A1 | * | 6/2022 | Baier | H04B 1/719 |
| 2022/0286152 A1 | * | 9/2022 | Wang | H04B 1/0475 |
| 2022/0303025 A1 | * | 9/2022 | Cheng | H04B 17/0085 |
| 2023/0057043 A1 | * | 2/2023 | Tseng | H04B 17/21 |

* cited by examiner

*Primary Examiner* — Jaison Joseph
(74) *Attorney, Agent, or Firm* — WPAT, P.C., Intellectual Property Attorneys; Anthony King

(57) ABSTRACT

The application discloses a transceiver, including a calibration signal generation unit, a transmission unit, a receiving unit and a control unit. The calibration signal generation unit generates test signal to the transmission unit in a phase calibration mode. The receiving unit generates a digital receiving signal. The control unit calculates a phase difference between the digital receiving signal and a given reference phase and selectively adjust the transmission unit or the receiving unit accordingly. The application discloses a transceiver calibration method as well.

20 Claims, 4 Drawing Sheets

TRANSCEIVER AND TRANSCEIVER CALIBRATION METHOD

CROSS-REFERENCE TO RELATED APPLICATIONS

This application claims priority of Taiwan application No. 110130524 filed on Aug. 18, 2021, which is hereby incorporated herein by reference in its entirety.

TECHNICAL FIELD

The present application relates to communication devices; in particular, to a transceiver and a transceiver calibration method.

BACKGROUND

Wireless multi-input multi-output (MIMO) systems are becoming more and more popular, and related applications such as indoor positioning systems and beamforming techniques are becoming more and more popular. The phase information of each transceiver plays an important role in these applications, and only by obtaining the correct phase difference between transceivers can the correct channel information be estimated.

SUMMARY OF THE INVENTION

The present application provides a transceiver, including: a calibration signal generation unit, configured to generate a test signal to a transmission unit in a phase calibration mode; the transmission unit, includes: a digital-to-analog converter, configured to generate an analog test signal according to the test signal; a first IQ clock generator, configured to generate a first clock and a second clock according to a reference clock, wherein the first clock and the second clock have a same frequency and a phase difference of 90 degrees; a fixed phase frequency divider, configured to generate a third clock according to the reference clock, wherein a phase delay caused by the fixed phase frequency divider is fixed; and a frequency upconverter, configured to upconvert the analog test signal to a frequency up-converted signal according to the first clock or the third clock; a receiving unit, wherein in the phase calibration mode, the receiving unit is coupled to the transmission unit via a wire, and the receiving unit includes: a second IQ clock generator, configured to generate a fourth clock and a fifth clock according to the reference clock, wherein the fourth clock and the fifth clock have a same frequency and a phase difference of 90 degrees; and a frequency downconverter, configured to generate a frequency down-converted signal according to the frequency up-converted signal and the fourth clock; an analog-to-digital converter, configured to generate a digital receiving signal according to the frequency down-converted signal; and a control unit, configured to calculate a phase difference between the digital receiving signal and a known reference phase, and selectively adjust the first IQ clock generator to change the phases of the first clock and the second clock, or selectively adjust the second IQ clock generator to change the phases of the fourth clock and the fifth clock, accordingly.

The present application provides a transceiver calibration method, including: generating a test signal in a phase calibration mode; generating an analog test signal according to the test signal; generating a first clock and a second clock according to a reference clock, wherein the first clock and the second clock have a same frequency and a phase difference of 90 degrees; using a fixed phase frequency divider to generate a third clock according to the reference clock, wherein a phase delay caused by the fixed phase frequency divider is fixed; upconverting the analog test signal to a frequency up-converted signal according to the first clock or the third clock; generating a fourth clock and a fifth clock according to the reference clock, wherein the fourth clock and the fifth clock have a same frequency and a phase difference of 90 degrees; generating a frequency down-converted signal according to the frequency up-converted signal and the fourth clock; generating a digital receiving signal according to the frequency down-converted signal; and calculating a phase difference between the digital receiving signal and known reference phase, and selectively changing the phases of the first clock and the second clock, or selectively changing the phases of the fourth clock and the fifth accordingly.

The transceiver and transceiver calibration method according to the present application can ensure that the phase state of each transceiver in the MIMO system remains consistent after each power-on or reset.

BRIEF DESCRIPTION OF THE DRAWINGS

Various aspects of the present application can best be understood upon reading the detailed description below and accompanying drawings. It should be noted that the various features in the drawings are not drawn to scale in accordance with standard practice in the art. In fact, the size of some features may be deliberately enlarged or reduced for the purpose of discussion.

DETAILED DESCRIPTION

Figure 1:
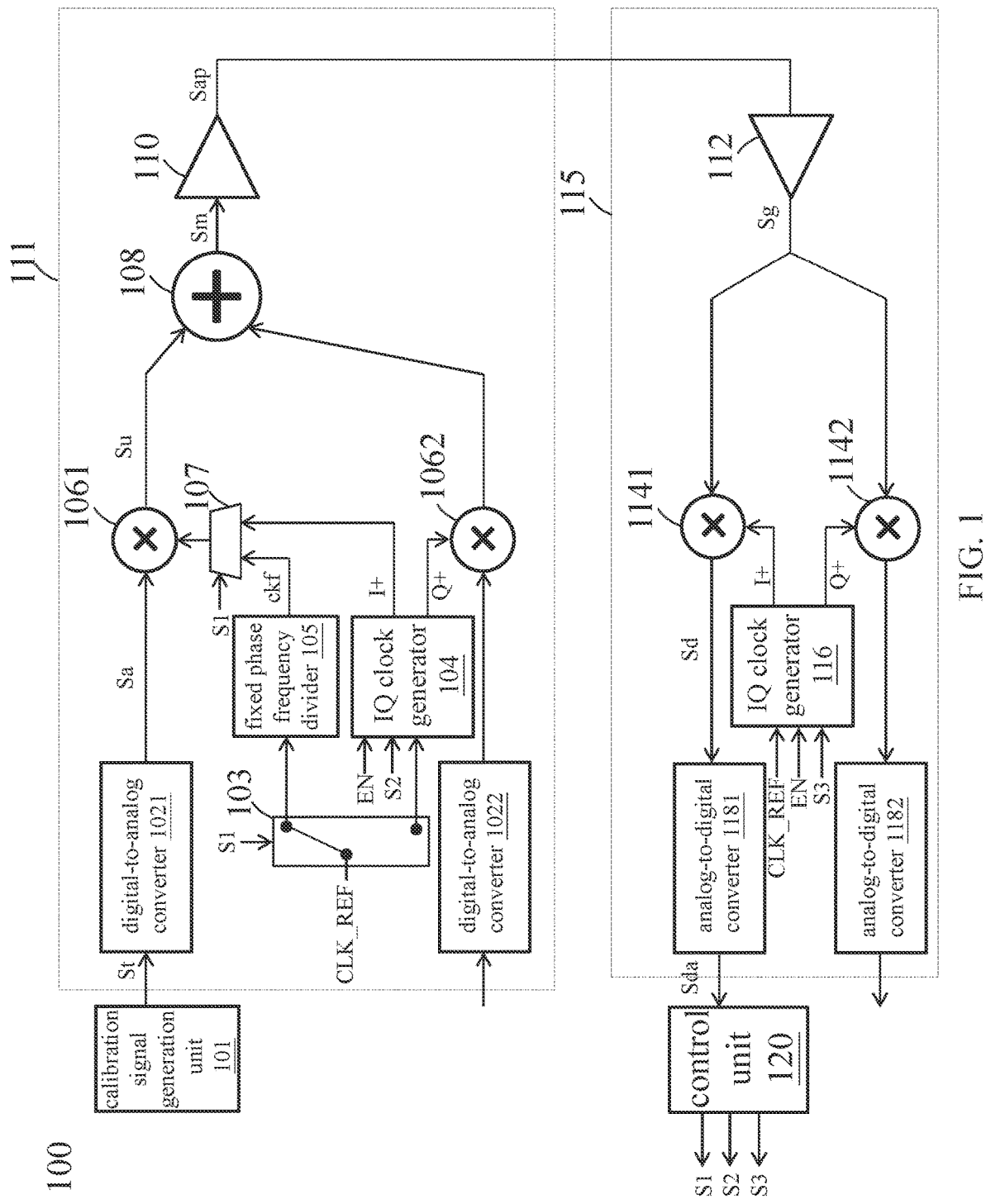
FIG. 1 is a schematic diagram illustrating a transceiver according to embodiments of the present application.

FIG. 1 is a schematic diagram illustrating a transceiver according to embodiments of the present application. For the sake of brevity, the transceiver 100 only includes a pair of a transmission unit 111 and a receiving unit 115, and FIG. 1 only shows the elements in the transmission unit 111 and the receiving unit 115 that are necessary for discussing the phase calibration process of the present application. For example, FIG. 1 does not show the antenna of the transmission unit 111 and the receiving unit 115. A wireless MIMO system includes more than one transceiver 100. The transmission unit 111 includes an IQ clock generator 104, configured to generate an in-phase clock I+ and a quadrature clock Q+ according to reference clock CLK_REF in a normal mode to an in-phase transmission path (including a digital-to-analog converter 1021 and a frequency upconverter 1061) and a quadrature transmission path (including a digital-to-analog converter 1022 and a frequency upconverter 1062), respectively; similarly, the receiving unit 115 includes an IQ clock generator 116, configured to generate an in-phase clock I+ and a quadrature clock Q+ according to reference clock CLK_REF in a normal mode to an in-phase receiving path (including a frequency downconverter 1141 and an analog-to-digital converter 1181) and quadrature receiving path (including a frequency downconverter 1142 and an analog-to-digital converter 1182), respectively.

Figure 2:
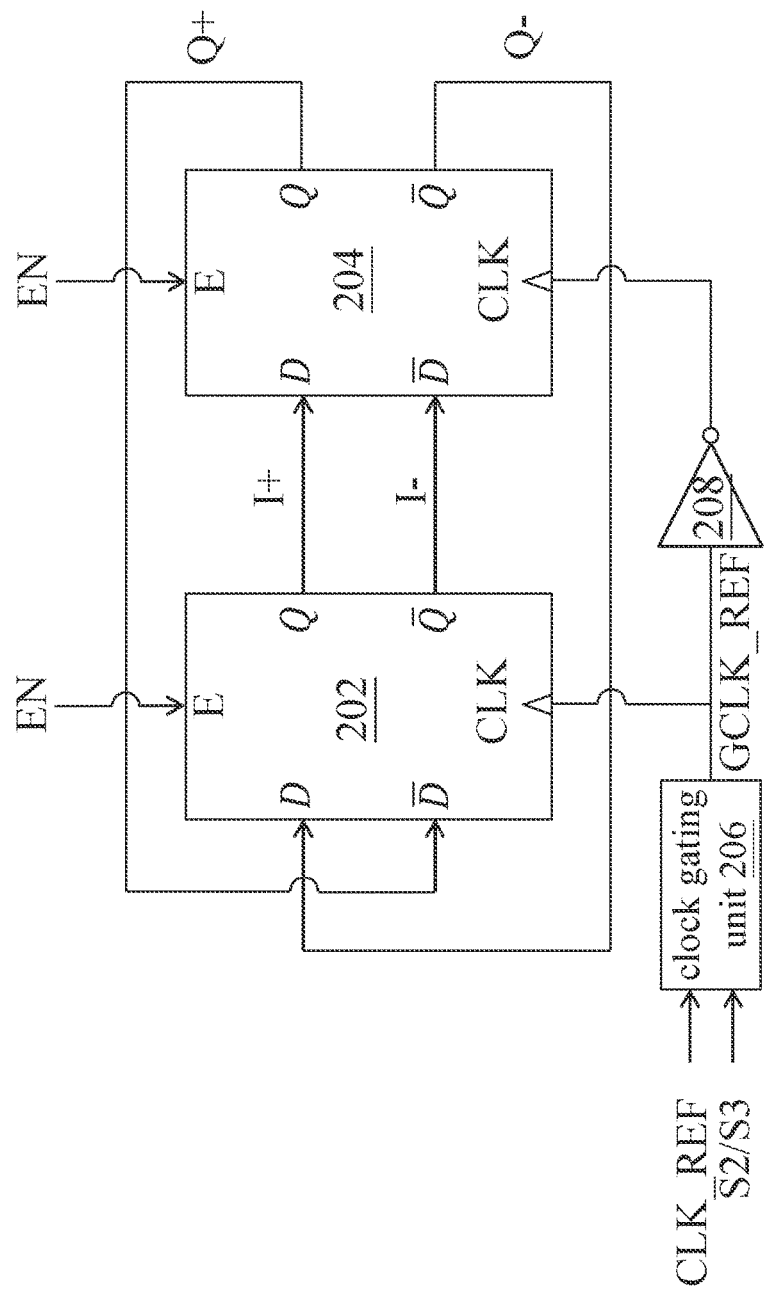
FIG. 2 is a schematic diagram illustrating embodiments of an IQ clock generator.
Figure 3:
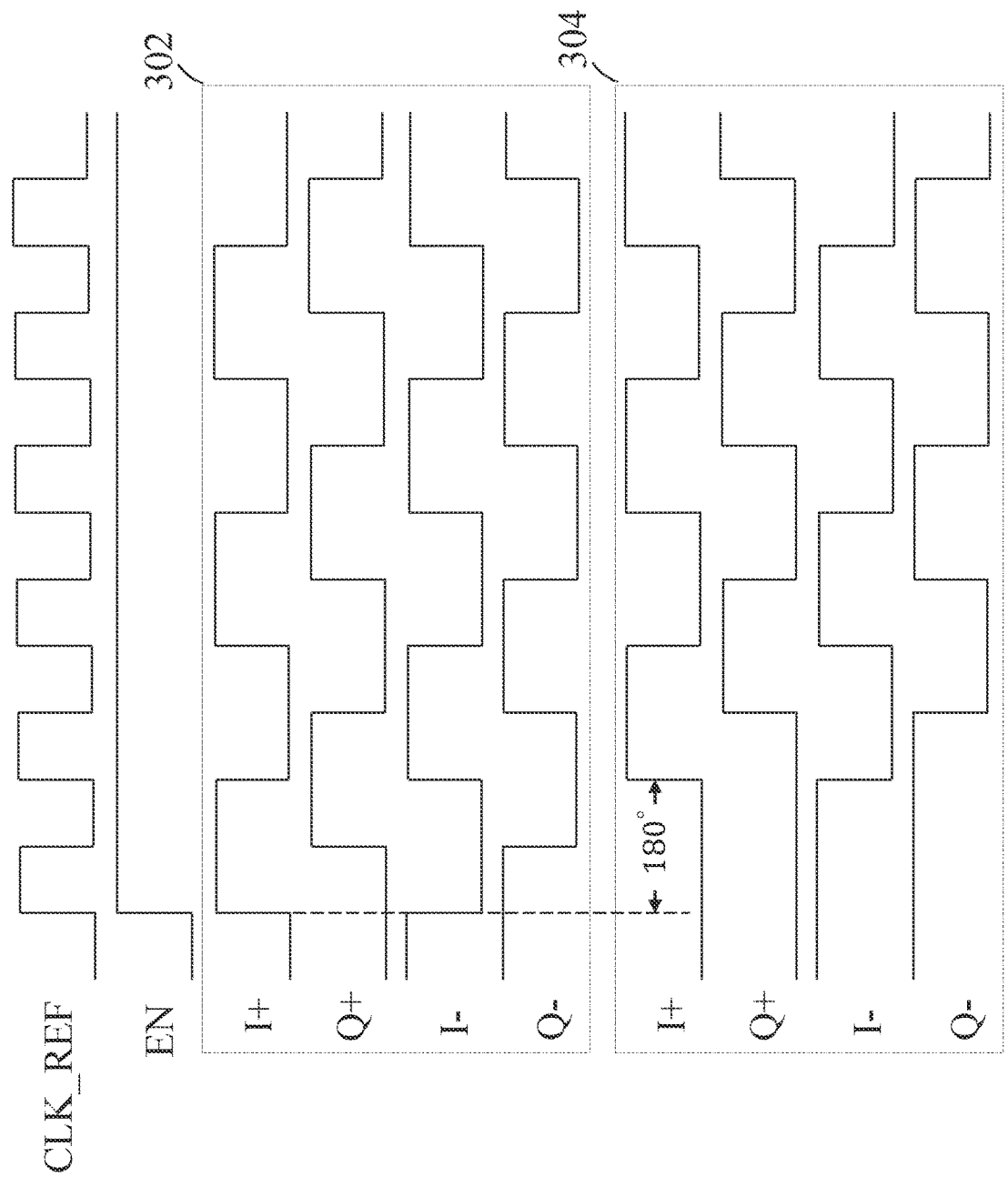
FIG. 3 is a timing diagram of an IQ clock generator.

The IQ clock generators 104/116 have the same structure and are configured to divide the frequency of the reference clock CLK_REF by two and generate the in-phase clock I+ and the quadrature clock Q+ with a frequency of ½ of the reference clock CLK_REF and the phases thereof are orthogonal to each other. FIG. 2 is a schematic diagram illustrating embodiments of IQ clock generators 104/116 (however the present application is not limited thereto). FIG. 3 is a timing diagram of the IQ clock generators 104/116. IQ clock generators 104/116 include flip-flops 202 and 204, both having an enable terminal E, a clock input terminal CLK, a positive input terminal D, a negative input terminal $\overline{D}$, a positive output terminal Q and a negative output terminal $\overline{Q}$. IQ clock generators 104/116 further includes a clock gating unit 206 and an inverter 208, wherein the clock gating unit 206 is configured to selectively perform gating on the reference clock CLK according to the control of the control unit 120 and generate a gated clock GCLK_REF to the clock input terminal CLK of the flip-flop 202; the inverter 208 is coupled between clock gating unit 206 and the clock input terminal CLK of the flip-flop 204. As shown in FIG. 2, the output of the positive output terminal Q of the flip-flop 202 is used as the in-phase clock I+, the output of the positive output terminal Q of the flip-flop 204 is used as the quadrature clock Q+(which can be interchanged in other embodiments), the positive output terminal Q of the flip-flop 204 is coupled to the negative input terminal $\overline{D}$ of the flip-flop 202; the negative output terminal $\overline{Q}$ of the flip-flop 204 is coupled to the positive input terminal D of the flip-flop 202; the positive output terminal Q of the flip-flop 202 is coupled to the positive input terminal D of the flip-flop 204; the negative output terminal $\overline{Q}$ of the flip-flop 202 is coupled to the negative input terminal D of the flip-flop 204. The enable terminals E of the flip-flop 202 and the flip-flop 204 are configured to receive an enable signal EN.

In the case that the clock gating unit 206 always does not perform gating on the reference clock CLK_REF, the enable signal EN enables the IQ clock generators 104/116 after each re-power on or reset of the transceiver 100, as shown in FIG. 3. Because the non-ideal reference clock CLK_REF has a certain degree of jitter, for the signal EN, it may cause two starting states 302 and 304. The result is that the phase difference between the in-phase clock I+ in the starting state 302 and the in-phase clock I+ in the starting state 304 is 180 degrees, and the same for the clocks I−, Q+, and Q−. That is to say, in the MIMO system, after each power-on or reset, the in-phase clock I+ of the transmission unit 111 and the in-phase clock I+ of the receiving unit 115 in the same transceiver 100 may belong to the starting state 302 or 304, respectively, and the in-phase clock I+ of the transmitting unit 111 and the in-phase clock I+ of the receiving unit 115 of different transceivers 100 may also belong to the starting state 302 or 304.

Therefore, the transceiver 100 according to embodiments of the present application, after each re-power or reset, will first enter a phase calibration mode before entering the normal mode, wherein phase calibration mode sequentially includes a receiving unit calibration phase and a transmission unit calibration phase. In the phase calibration mode, the transceiver 100 uses the calibration signal generation unit 101 to generate a test signal St to the transmission unit 111, and returning back to control unit 120 after passing through the transmission unit 111 and the receiving unit 115, wherein the control unit 120 then determine, accordingly, whether to adjust the clock gating unit 206 of the IQ clock generators 104/116, so that IQ clock generator 104 and the IQ clock generator 116 are both fixed in the active state 302; as could be appreciated, it is also possible to fix both the IQ clock generator 104 and the IQ clock generator 116 in the active state 304.

Figure 4:
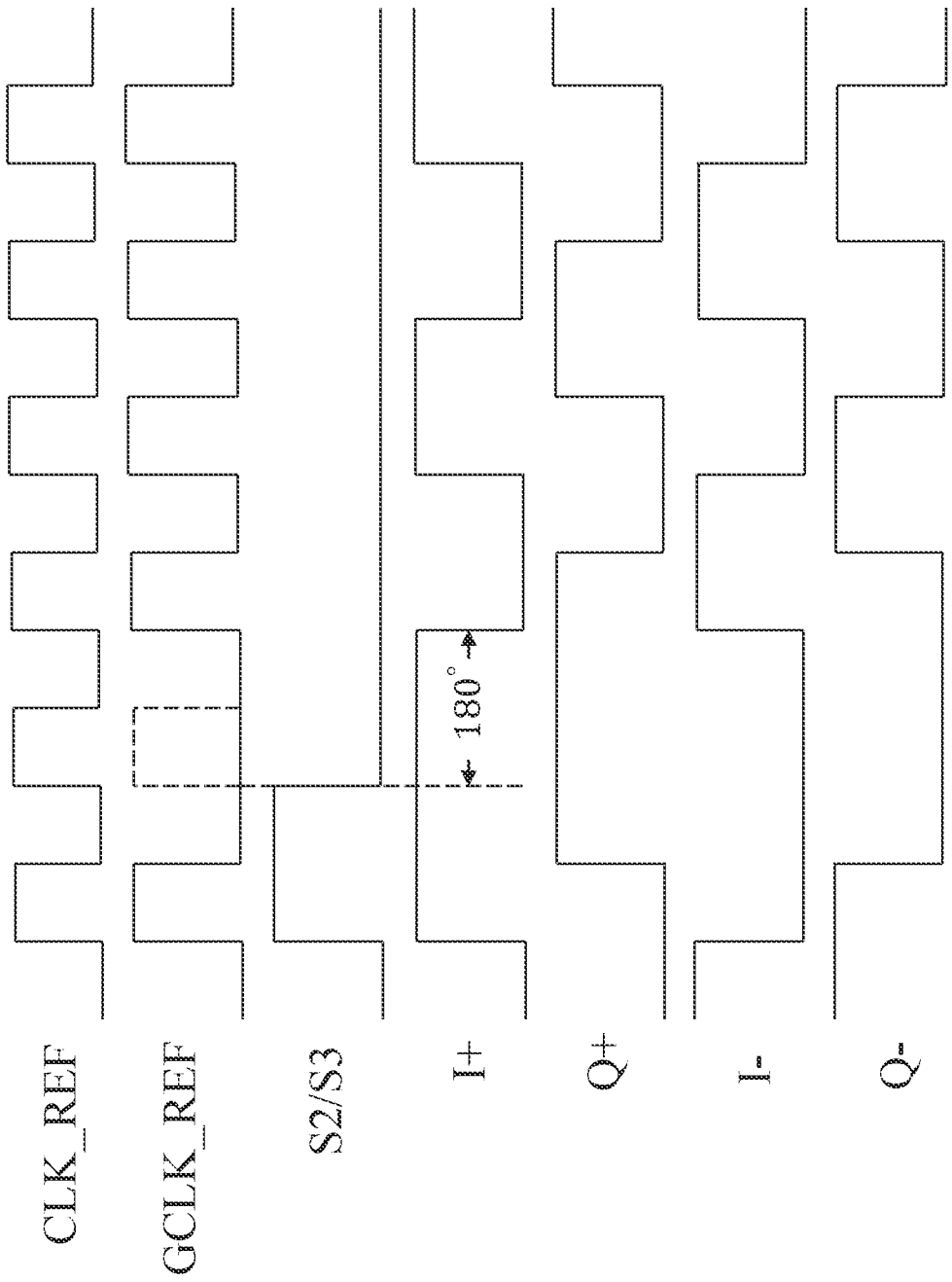
FIG. 4 is a timing diagram of an IQ clock generator when the clock gating unit is active.

The function of the clock gating unit 206 is discussed with reference to FIG. 4. When the signal S2/S3 from the control unit 120 changes from a low level to a high level for a period T of the reference clock CLK_REF, the clock gating unit 206 correspondingly gates the reference clock CLK_REF for a period T so that the gated clock GCLK that is outputted remains at a low level for a period T. In this way, the phases of the in-phase clock I+, clock I−, Q+, and Q− of the IQ clock generators 104/116 are all delayed by 180 degrees.

Returning to FIG. 1, in the phase calibration mode, the calibration of the in-phase signal I+ can be done by only using the in-phase transmission path and the in-phase receiving path, and since the phase difference between the quadrature signal Q+ and the in-phase signal I+ is fixed at 90 degrees, the calibration of the in-phase signal I+ is essentially the same as the calibration of the quadrature signal Q+, so the quadrature transmission path and the quadrature receiving path are not used. In some embodiments, it is possible to do the opposite, i.e., to use the quadrature transmission path and the quadrature receiving path to complete the calibration of the quadrature signal Q+ without calibrating the in-phase signal I+.

Since the phase delays of the clocks generated by the IQ clock generators 104 and 116 are both uncertain, in the phase calibration mode, the process first proceeds to the receiving unit calibration phase; during this stage, the frequency upconverter 1061 of the transmission unit 111 uses a fixed phase clock ckf of the fixed phase frequency divider 105 to replace the in-phase signal I+, so as to focus on calibrating the IQ clock generator 116 of the receiving unit 115; the phase delay of the fixed phase frequency divider 105 is fixed. After completing the calibration of the IQ clock generator 116, the process then proceeds to the transmission unit calibration phase, during which stage the IQ clock generator 104 of the calibration the transmission unit 111 is calibrated.

Specifically, both the fixed phase frequency divider 105 and the IQ clock generator 104 can generate a clock having a frequency that is ½ of the frequency of the reference clock CLK_REF, but the difference is that the fixed-phase frequency divider 105 is only used in the phase calibration mode, so the bandwidth thereof does not need to be very wide, as long as it can be used to operate in a narrower specific frequency band; the point is to ensure that the fixed-phase frequency divider 105 does not randomly output two opposite-phase clocks like the IQ clock generator 104. In other words, the phase delay of the fixed-phase frequency divider 105 is fixed. That is, in a MIMO system, although the fixed-phase frequency divider 105 of each transceiver 100 is independent from each other, the phase of the fixed phase clock ckf generated by the fixed phase frequency divider 105 of each transceiver 100 is the same as each other after each re-power or reset. The fixed phase frequency divider 105 may be, for example, a Miller frequency divider.

In the receiving unit calibration phase, the digital-to-analog converter 1021 generates an analog test signal Sa according to the test signal St. The control unit 120 uses the signal S1 to control the multiplexer 103 to couple the reference signal CLK_REF to the input terminal of the fixed phase frequency divider 105 and uses the signal S1 to control the multiplexer 107 to couple the output terminal of the fixed phase frequency divider 105 to the frequency upconverter 1061, so that the frequency upconverter 1061 upconverts the analog test signal Sa to generate a frequency up-converted signal Su according to the fixed phase clock ckf. In this case, the IQ clock generator 104 does not receive the reference signal CLK_REF, and hence, the frequency upconverter 1062 of the quadrature transmission path does not operate. In the meantime, in the phase correction mode, no input signal is given to the digital-to-analog converter 1022 of the orthogonal path, so a combiner 108 generates a combined signal Sm only based on the frequency up-converted signal Su. After the combined signal Sm is passed through the amplifier 110 to generate an amplified signal Sap, it is fed back to a gain unit 112 of the receiving unit 115 through a wired path and outputs a gain signal Sg. The wired path may be implemented only in the chip where the transceiver 100 is located or be implemented by wires on the circuit board outside the chip.

The frequency downconverter 1141 reduces the gain signal Sg to the fundamental frequency according to the in-phase clock I+ generated by the IQ clock generator 116 and generates a frequency down-converted signal Sd. The analog-to-digital converter 1181 converts the frequency down-converted signal Sd from an analog signal to a digital receiving signal Sda to the control unit 120. The control unit 120 calculates the phase difference Pd1 between the digital receiving signal Sda and a known reference phase. Specifically, the control unit 120 performs Fourier transform on the digital receiving signal Sda to obtain a real part and an imaginary part of the digital receiving signal Sda, and then compares them with the real part and the imaginary part of the known reference phase to obtain a phase difference Pd1, the phase difference Pd1 between the digital receiving signal Sda and the known reference phase may have two values differing by 180 degrees resulted from the IQ clock generator 116. In the present embodiment, for the ease of phase comparison, the test signal St is a single-tone signal. If 0 degrees≤phase difference Pd1<180 degrees, the control unit 120 generates a signal S3 to control the clock gating unit 206 of the IQ clock generator 116 to not gating the reference clock CLK_REF; if −180 degrees≤phase difference Pd1<0 degrees, the control unit 120 generates a signal S3 to control the clock gating unit 206 of the IQ clock generator 116 to gate the reference clock CLK_REF for a period T, thereby causing 0 degrees≤phase difference Pd1<180. It is also feasible to modify the above-mentioned process, so that all the phase differences Pd1 are adjusted to −180 degrees-≤phase difference Pd1<0 degrees, as long as it can achieve the purpose to allow the phases of the clock I+ generated by the IQ clock generator 116 of each the transceiver 100 in the MIMO system to be the same and known after each re-power or reset.

Next, the process proceeds from the receiving unit calibration phase into the transmission unit calibration phase, wherein the digital-to-analog converter 1021 generates an analog test signal Sa according to a test signal St. The control unit 120 uses the signal S1 to control the multiplexer 103 to couple the reference signal CLK_REF to the input terminal of the IQ clock generator 104 and uses the signal S1 to control the multiplexer 107 to couple the output terminal of the IQ clock generator 104 to the frequency upconverter 1061, so that the frequency upconverter 1061 upconverts the analog test signal Sa according to clock I+ to generate the frequency up-converted signal Su. In the phase calibration mode, no signal is inputted to the digital-to-analog converter 1022 in the orthogonal path, and hence, the combiner 108 generates the combined signal Sm only based on the frequency up-converted signal Su. After the combined signal Sm is passed through the amplifier 110 to generate an amplified signal Sap, it is fed back to a gain unit 112 of the receiving unit 115 through the wired path and outputs a gain signal Sg.

The frequency downconverter 1141 reduces the gain signal Sg to the fundamental frequency according to the in-phase clock I+ generated by the IQ clock generator 116 and generates a frequency down-converted signal Sd. The analog-to-digital converter 1181 converts the frequency down-converted signal Sd from an analog signal to a digital receiving signal Sda to the control unit 120. The control unit 120 calculates the phase difference Pd2 between the digital receiving signal Sda and the known reference phase. Since the phase delay of the IQ clock generator 116 has been calibrated as a known delay in the receiving unit calibration phase, the uncertainty of the phase difference Pd2 comes from only the IQ clock generator 104. If 0 degrees≤phase difference Pd2<180 degrees, the control unit 120 generates the signal S2 to control the clock gating unit 206 of the IQ clock generator 104 to not gating the reference clock CLK_REF; if −180≤degrees phase difference Pd2<0 degrees, the control unit 120 generate the signal S2 to control the clock gating unit 206 of the IQ clock generator 104 to gate the reference clock CLK_REF for a period T, thereby causing 0 degrees≤phase difference Pd2<180. It is also feasible to modify the above-mentioned process, so that all the phase differences Pd2 are adjusted to −180 degrees-≤phase difference Pd2<0 degrees, as long as it can achieve the purpose to allow the phases of the clock I+ generated by the IQ clock generator 116 of each the transceiver 100 in the MIMO system to be the same and known after each re-power or reset. At this point, the transmission unit calibration phase is completed and the transceiver 100 can leave the phase calibration mode and enter the normal mode.

What is claimed is:

1. A transceiver, comprising:
   a calibration signal generation unit, configured to generate a test signal to a transmission unit in a phase calibration mode;
   the transmission unit, includes:
      a digital-to-analog converter, configured to generate an analog test signal according to the test signal;
      a first IQ clock generator, configured to generate a first clock and a second clock according to a reference clock, wherein the first clock and the second clock have a same frequency and a phase difference of 90 degrees;
      a fixed phase frequency divider, configured to generate a third clock according to the reference clock, wherein a phase delay caused by the fixed phase frequency divider is fixed; and
      a frequency upconverter, configured to upconvert the analog test signal to a frequency up-converted signal according to the first clock or the third clock;
   a receiving unit, wherein in the phase calibration mode, the receiving unit is coupled to the transmission unit via a wire, and the receiving unit includes:
      a second IQ clock generator, configured to generate a fourth clock and a fifth clock according to the reference clock, wherein the fourth clock and the fifth clock have a same frequency and a phase difference of 90 degrees; and
      a frequency downconverter, configured to generate a frequency down-converted signal according to the frequency up-converted signal and the fourth clock;
      an analog-to-digital converter, configured to generate a digital receiving signal according to the frequency down-converted signal; and a control unit, configured to calculate a phase difference between the digital receiving signal and a known reference phase, and selectively adjust the first IQ clock generator to change the phases of the first clock and the second clock, or selectively adjust the second IQ clock generator to change the phases of the fourth clock and the fifth clock, accordingly.

2. The transceiver of claim 1, wherein the first IQ clock generator includes;
a first flip-flop, having a first clock input terminal, a first positive input terminal, a first negative input terminal, a first positive output terminal and a first negative output terminal;
a second flip-flop, having a second clock input terminal, a second positive input terminal, a second negative input terminal, a second positive output terminal and a second negative output terminal, wherein the second positive input terminal is coupled to the first positive output terminal, the second negative input terminal is coupled to the first negative output terminal, the second positive output terminal is coupled to the first positive input terminal, and the second negative output terminal is coupled to the first positive input terminal;
a clock gating unit, configured to selectively perform gating on the reference clock according to the control of the control unit and generate a first gated clock to the first clock input terminal; and
an inverter, coupled between the first clock gating unit and the second clock input terminal;
wherein one of the first positive output terminal and the second positive output terminal outputs the first clock, and the other of the first positive output terminal and the second positive output terminal outputs the second clock.

3. The transceiver of claim 2, wherein the second IQ clock generator includes:
a third flip-flop, having a third clock input terminal, a third positive input terminal, a third negative input terminal, a third positive output terminal and a third negative output terminal;
a fourth flip-flop, having a fourth clock input terminal, a fourth positive input terminal, a fourth negative input terminal, a fourth positive output terminal and a fourth negative output terminal, wherein the fourth positive input terminal is coupled to the second positive output terminal, the fourth negative input terminal is coupled to the second negative output terminal, the fourth positive output terminal is coupled to the second positive input terminal, the fourth negative output terminal is coupled to the second positive input terminal;
a clock gating unit, configured to selectively perform gating on the reference clock according to the control of the control unit and generate a second gated clock to the third clock input terminal; and
an inverter, coupled between the second clock gating unit and the fourth clock input terminal;
wherein one of the third positive output terminal and the fourth positive output terminal outputs the fourth clock, and the other of the third positive output terminal and the fourth positive output terminal outputs the fifth clock.

4. The transceiver of claim 3, wherein the phase calibration mode includes a receiving unit calibration phase and a transmission unit calibration phase, wherein in the receiving unit calibration phase, the control unit controls the frequency upconverter according to the third clock to generate the frequency up-converted signal and performs Fourier transform on the digital receiving signal to obtain a real part and an imaginary part of the digital receiving signal, and calculates a phase difference between the digital receiving signal and the known reference phase according to the real part and the imaginary part of the digital receiving signal.

5. The transceiver of claim 4, wherein in the receiving unit calibration phase, when the phase difference between the digital receiving signal and the known reference phase is greater than or equal to 0 degree and less than 180 degrees, the control unit controls the clock gating unit of the second IQ clock generator to not perform gating on the reference clock; and when the phase difference between the digital receiving signal and the known reference phase is greater than or equal to −180 degrees and less than 0 degree, the control unit controls the clock gating unit of the second IQ clock generator to perform gating on the reference clock for a period of the reference clock so that the phase difference between the digital receiving signal and the known reference phase becomes greater than or equal to 0 degree and less than 180 degrees.

6. The transceiver of claim 5, wherein in the transmission unit calibration phase after the receiving unit calibration phase, the control unit controls the frequency upconverter to generate the frequency up-converted signal according to the first clock, and performs Fourier transform on the digital receiving signal to obtain the real part and the imaginary part of the digital receiving signal, and calculates the phase difference between the digital receiving signal and the known reference phase according to the real part and the imaginary part of the digital receiving signal.

7. The transceiver of claim 6, wherein in the transmission unit calibration phase, when the phase difference between the digital receiving signal and the known reference phase is greater than or equal to 0 degree and less than 180 degrees, the control unit controls the clock gating unit of the first IQ clock generator to not perform gating on the reference clock; and when the phase difference between the digital receiving signal and the known reference phase is greater than or equal to −180 degrees and less than 0 degree, the control unit controls the clock gating unit of the first IQ clock generator to perform gating on the reference clock for a period of the reference clock, so that the phase difference between the digital receiving signal and the known reference phase becomes greater than or equal to 0 degree and less than 180 degrees.

8. The transceiver of claim 1, wherein the transmission unit further includes a multiplexer, including an input terminal, a first output terminal and a second output terminal, wherein the input terminal is configured to receive the reference clock, the first output terminal is coupled to the fixed phase frequency divider, the second output terminal is coupled to the first IQ clock generator, when the control unit controls the frequency upconverter to upconvert the analog test signal to the frequency up-converted signal according to the first clock, the input terminal is coupled to the second output terminal; and when the control unit controls the frequency upconverter to upconvert the analog test signal to the frequency up-converted signal according to the third clock, the input terminal is coupled to the first output terminal.

9. The transceiver of claim 1, wherein the fixed phase frequency divider is a Miller frequency divider.

10. The transceiver of claim 1, wherein in the phase calibration mode, the test signal is a single-tone signal.

11. A transceiver calibration method, comprising:
generating a test signal in a phase calibration mode;

generating an analog test signal according to the test signal;

generating a first clock and a second clock according to a reference clock, wherein the first clock and the second clock have a same frequency and a phase difference of 90 degrees;

using a fixed phase frequency divider to generate a third clock according to the reference clock, wherein a phase delay caused by the fixed phase frequency divider is fixed;

upconverting the analog test signal to a frequency upconverted signal according to the first clock or the third clock;

generating a fourth clock and a fifth clock according to the reference clock, wherein the fourth clock and the fifth clock have a same frequency and a phase difference of 90 degrees;

generating a frequency down-converted signal according to the frequency up-converted signal and the fourth clock;

generating a digital receiving signal according to the frequency down-converted signal; and calculating a phase difference between the digital receiving signal and known reference phase, and selectively changing the phases of the first clock and the second clock, or selectively changing the phases of the fourth clock and the fifth clock accordingly.

12. The method of claim 11, wherein the step of selectively changing the phases of the first clock and the second clock includes:
   selectively performing gating on the reference clock, and generating a first gated clock; and
   generating the first clock and the second clock according to the first gated clock.

13. The method of claim 12, wherein the step of selectively changing the phases of the fourth clock and the fifth clock includes:
   selectively performing gating on the reference clock, and generating a second gated clock; and
   generating the fourth clock and the fifth clock according to the second gated clock.

14. The method of claim 13, wherein the phase calibration mode includes a receiving unit calibration phase and a transmission unit calibration phase, and the step of upconverting the analog test signal to the frequency up-converted signal according to the first clock or the third clock comprises:
   generating the frequency up-converted signal according to the third clock in the receiving unit calibration phase; and
   the step of calculating the phase difference between the digital receiving signal and the known reference phase comprises:
   performing Fourier transform on the digital receiving signal to obtain a real part and an imaginary part of the digital receiving signal and obtaining the phase difference between the digital receiving signal and the known reference phase according to the real part and the imaginary part of the digital receiving signal.

15. The method of claim 14, wherein the step of selectively changing the phases of the first clock and the second clock or selectively changing the phases of the fourth clock and the fifth clock comprises:
   in the receiving unit calibration phase, when the phase difference between the digital receiving signal and the known reference phase is greater than or equal to 0 degree and less than 180 degrees, generating a second gated clock without performing gating on the reference clock; and when the phase difference between the digital receiving signal and the known reference phase is greater than or equal to −180 degrees and less than 0 degree, performing gating on the reference clock for a period of the reference clock to generate a second gated clock, so that the phase difference between the digital receiving signal and the known reference phase becomes greater than or equal to 0 degree and less than 180 degrees.

16. The method of claim 15, wherein the step of upconverting the analog test signal to the frequency up-converted signal according to the first clock or the third clock further comprises:
   in the transmission unit calibration phase after the receiving unit calibration phase, generating the frequency up-converted signal according to the first clock; and
   the step of calculating the phase difference between the digital receiving signal and the known reference phase comprises:
   performing Fourier transform on the digital receiving signal to obtain the real part and the imaginary part of the digital receiving signal and obtaining the phase difference between the digital receiving signal and the known reference phase according to the real part and the imaginary part of the digital receiving signal.

17. The method of claim 16, wherein the step of selectively changing the phases of the first clock and the second clock or selectively changing the phases of the fourth clock and the fifth clock comprises:
   in the transmission unit calibration phase, when the phase difference between the digital receiving signal and the known reference phase is greater than or equal to 0 degree and less than 180 degrees, generating a first gated clock without performing gating on the reference clock; and when the phase difference between the digital receiving signal and the known reference phase is greater than or equal to −180 degrees and less than 0 degree, performing gating on the reference clock perform for a period of the reference clock to generate a first gated clock, so that the phase difference between the digital receiving signal and the known reference phase becomes greater than or equal to 0 degree and less than 180 degrees.

18. The method of claim 11, wherein the step of generating the third clock according to the reference clock comprises:
   using a Miller frequency divider to generate the third clock.

19. The method of claim 11, wherein the frequency of the third clock is the same as the frequency of the first clock.

20. The method of claim 11, wherein in the phase calibration mode, the test signal is a single-tone signal.

* * * * *